United States Patent
Morovic et al.

(10) Patent No.: US 10,440,231 B2
(45) Date of Patent: Oct. 8, 2019

(54) GENERATING CALIBRATED LUT PROVIDING NPAC RESPONSE UTILIZING CALIBRATION ELEMENT FOR HANS LUT DESCRIBING DROP WEIGHT DEVIATION BASED ON MEASUREMENT DATA

(71) Applicant: Hewlett-Packard Development Company, L.P., Houston, TX (US)

(72) Inventors: Peter Morovic, Sant Cugat del Valles (ES); Jan Morovic, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/073,393

(22) PCT Filed: Apr. 21, 2016

(86) PCT No.: PCT/US2016/028662
§ 371 (c)(1),
(2) Date: Jul. 27, 2018

(87) PCT Pub. No.: WO2017/184151
PCT Pub. Date: Oct. 26, 2017

(65) Prior Publication Data
US 2019/0037109 A1  Jan. 31, 2019

(51) Int. Cl.
*H04N 1/60* (2006.01)
*H04N 1/00* (2006.01)
(Continued)

(52) U.S. Cl.
CPC .......... *H04N 1/60* (2013.01); *H04N 1/00023* (2013.01); *H04N 1/00034* (2013.01);
(Continued)

(58) Field of Classification Search
CPC .......... H04N 1/00023; H04N 1/00034; H04N 1/00068; H04N 1/00087; H04N 1/60;
(Continued)

(56) References Cited

U.S. PATENT DOCUMENTS 6,042,211 A * 3/2000 Hudson .................. B41J 2/2128
                                                     347/15
7,551,315 B2    6/2009 Hoshii et al.
(Continued)

FOREIGN PATENT DOCUMENTS

CN         16444383 A      7/2005
CN        101049755 A    10/2007
(Continued)

OTHER PUBLICATIONS 8 vertex HANS: An ultra-simple printer color architecture, (Research Paper), Nov. 8, 2013. Available at: http://www.slideshare.net/jmorovic/cic21-8-vertexhanss.

*Primary Examiner* — Scott A Rogers
(74) *Attorney, Agent, or Firm* — Tarolli Sundheim Covell & Tummino LLP (57) ABSTRACT

A system includes a memory to store at least one Halftone Area Neugebauer Separation (HANS) look-up table (LUT) that represents a predetermined drop weight for N colorant channels of a printer. The HANS LUT provides a given Neugebauer Primary area coverage in response to a device color input value. Measurement data stored in the memory represents measured drop weight values for the N colorant channels of the printer. A processor executes instructions stored in the memory. The instructions are to compute a calibration element for the HANS LUT that describes a drop-weight deviation with respect to the HANS LUT based on the measured drop weight values. The instructions are to
(Continued)

apply the calibration element to at least a portion of the HANS LUT to generate a calibrated LUT.

15 Claims, 5 Drawing Sheets

(51) Int. Cl.
    *H04N 1/50*     (2006.01)
    *H04N 1/54*     (2006.01)

(52) U.S. Cl.
    CPC ..... *H04N 1/00068* (2013.01); *H04N 1/00087* (2013.01); *H04N 1/50* (2013.01); *H04N 1/603* (2013.01); *H04N 1/605* (2013.01); *H04N 1/54* (2013.01)

(58) Field of Classification Search
    CPC ...... H04N 1/603; H04N 1/605; G06K 15/027; G06K 15/1878
    See application file for complete search history.

(56) References Cited

U.S. PATENT DOCUMENTS

| | | | |
|---|---|---|---|
| 7,645,014 B2 | 1/2010 | Kinas | |
| 7,645,015 B2* | 1/2010 | McConica | B41J 29/393 347/19 |
| 8,047,626 B1 | 11/2011 | Derhak et al. | |
| 8,570,605 B2* | 10/2013 | Murase | G06T 11/001 358/1.2 |
| 8,610,958 B2 | 12/2013 | Rossier et al. | |
| 9,883,081 B2* | 1/2018 | Vidal Fortia | G06K 15/102 |
| 2005/0083540 A1* | 4/2005 | Hersch | H04N 1/6025 358/1.9 |
| 2005/0185005 A1 | 8/2005 | Yamazaki | |
| 2007/0097440 A1 | 5/2007 | Majewicz | |
| 2014/0016143 A1 | 1/2014 | Morovic et al. | |
| 2014/0253931 A1 | 9/2014 | Hashizume | |
| 2016/0057314 A1 | 2/2016 | Morovic et al. | |
| 2016/0080608 A1* | 3/2016 | Morovic | H04N 1/6025 358/3.23 |
| 2016/0086059 A1 | 3/2016 | Morovic et al. | |
| 2019/0089867 A1* | 3/2019 | Morovic | G06K 15/027 |

FOREIGN PATENT DOCUMENTS

| | | |
|---|---|---|
| CN | 102029818 A | 4/2011 |
| CN | 102883889 A | 1/2013 |
| CN | 104038665 A | 9/2014 |
| CN | 105163945 A | 12/2015 |
| JP | 2005262757 A | 9/2005 |
| JP | 2015015612 A | 1/2015 |
| WO | WO-2015/012801 | 1/2015 |
| WO | WO-2015094206 | 6/2015 |

\* cited by examiner

GENERATING CALIBRATED LUT PROVIDING NPAC RESPONSE UTILIZING CALIBRATION ELEMENT FOR HANS LUT DESCRIBING DROP WEIGHT DEVIATION BASED ON MEASUREMENT DATA

BACKGROUND

Color printing results from a number of colorants of different colors being superimposed on top of a substrate, such as paper or other media. Since some printing technologies only allow for a very small number of levels of inks to be deposited at a given location on a substrate, half-toning is used to obtain ink patterns that result in a given color when seen from a suitable viewing distance. These halftone patterns also result in colorants being deposited on top of or next to one another in a specific manner, providing a color that relates nonlinearly to the amounts of the colorants (e.g., inks) used. Color control for the respective colorants may be increased due to Neugebauer's model of halftone color reproduction. Neugebauer's model may provide that the color of a halftone pattern is the convex combination of the colors of the Neugebauer primaries (NPs) used in the pattern. Thus, an NP is one of the possible ink overprints, with its convex weight being the relative area covered by it.

DETAILED DESCRIPTION

One example provided in this disclosure provides colorant calibration in a printing system utilizing calculated drop weight look-up tables (LUTs).

As one example, a calibration method for a Halftone Area Neugebauer Separation (HANS) pipeline derives a small number of parameters (e.g., N parameters for N colorant channels) to determine drop-weight changes that resulted in the need for color calibration of a printing system to be calibrated. The N parameters/proportions indicate a colorant-scalar value or colorant-vector with direction and magnitude that can be employed to generate a calibration element utilized to compute a calibration look-up table to calibrate the printing system. A HANS LUT can be generated that populates Neugebauer Primary (NP)—space that represents a variety of colorant-proportions. For a given Neugebauer Primary Area Coverage (NPac) node of the LUT [e.g., RGB→NPac], the respective NPac node can be modified by applying the colorant vector magnitude and direction (or scalar value) to a new location which can then be expressed as an interpolated node of the [NPac→RGB] LUT. A benefit in this example is that no NPac in the calibration process is introduced that is not already in the domain of the original LUT, hence preserving the original LUT properties (e.g., metrics, optimality, and so forth).

A cause of color variation in a printing system is often due to the variation of drop weight that relates to the amount of colorant dispensed from a given print nozzle in a printer. Thus, for the same number of drops applied in the system, smaller drops may result in lighter, less chromatic colors while larger drops may yield darker, more chromatic results. Color-calibrating a printing system can thus include compensating for colorant drop weight changes that result from printing system usage and/or due to environmental conditions. Current calibration procedures often may involve numerous and costly measurements to calibrate more advanced printing systems such as a Halftone Area Neugebauer Separation (HANS) system. As disclosed herein, systems and methods are provided in some examples to efficiently perform color calibration for a printing system.

Figure 1:
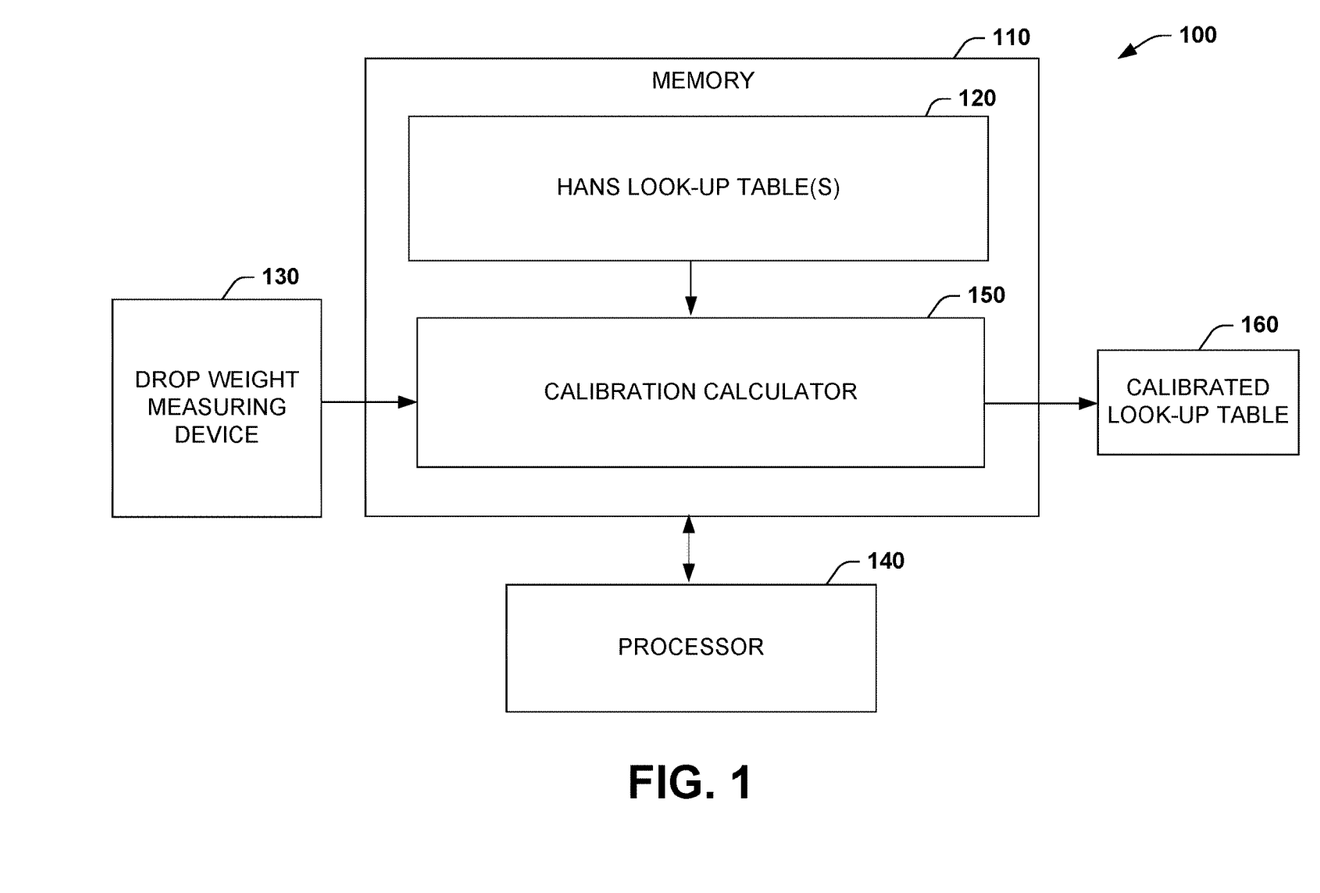
FIG. 1 illustrates an example of a system to generate a calibrated look-up table.

FIG. 1 illustrates an example of a system 100 that generates a calibrated LUT to provide efficient color calibration of a printer. The system 100 includes a memory 110 to store at least one Halftone Area Neugebauer Separation (HANS) LUT 120 that represents a predetermined drop weight for N colorant channels of a printer (See e.g., FIG. 4), N being a positive integer. The HANS LUT provides a given Neugebauer Primary area coverage (NPac) in response to a device color input value. The HANS LUT 120 provides one corresponding NPac for each node of the LUT in response to a device color input value that indexes to each node. The LUT 120 (or LUTS) can be indexed via Device Color (DC) values (e.g., RGB or CYMK or another color space) and contains one NPac per node. For example, in a regular, 3^3 LUT, there are 27 nodes in the LUT, each corresponding to DC ranges such as RGB values that can have all combinations of [e.g., 0%, 50%, 100%] value and where at each of the 27 nodes of that LUT there is one corresponding NPac. Colorants as described herein can include materials such as inks, glues, synthetics, toners, waxes, dyes, and so forth each having substantially any color or color combination. For example, the printer can employ different combinations of colorants, which can vary according to the color model implemented by the printer (e.g., Cyan, Magenta, Yellow and Black in a CMYK color model; Red, Green and Blue in an RGB color model or other color combinations).

A measuring device 130 measures drop weight values for the plurality of different colorants of the printing system. The measuring device can be implemented internally as part of the printer or it can be external to the printer, such as a separate apparatus that provides drop weight measurement values to the printer. The measuring device 130 can include using a closed-loop color system (not shown) that includes one or more color sensors to detect reflected optical energy from primary color tiles that are illuminated with a narrowband light source. This operates in a similar manner as a classical densitometer. In some cases, the printer (or external system) generates a target pattern on a substrate and the measuring device 130 scans the printed pattern to determine the drop weights. This can include utilizing print and measuring ramps of the individual inks to infer the drop weight of each ink, for example.

A processor 140 executes instructions from the memory 110. The processor 140 can be a central processing unit (CPU), field programmable gate array (FPGA), or a set of logic blocks that can be defined via a hardware description language such as VHDL. The instructions can be executed out of firmware, random access memory, and/or executed as configured logic blocks, such as via registers and state machines configured in a programmable gate array.

Figure 2:
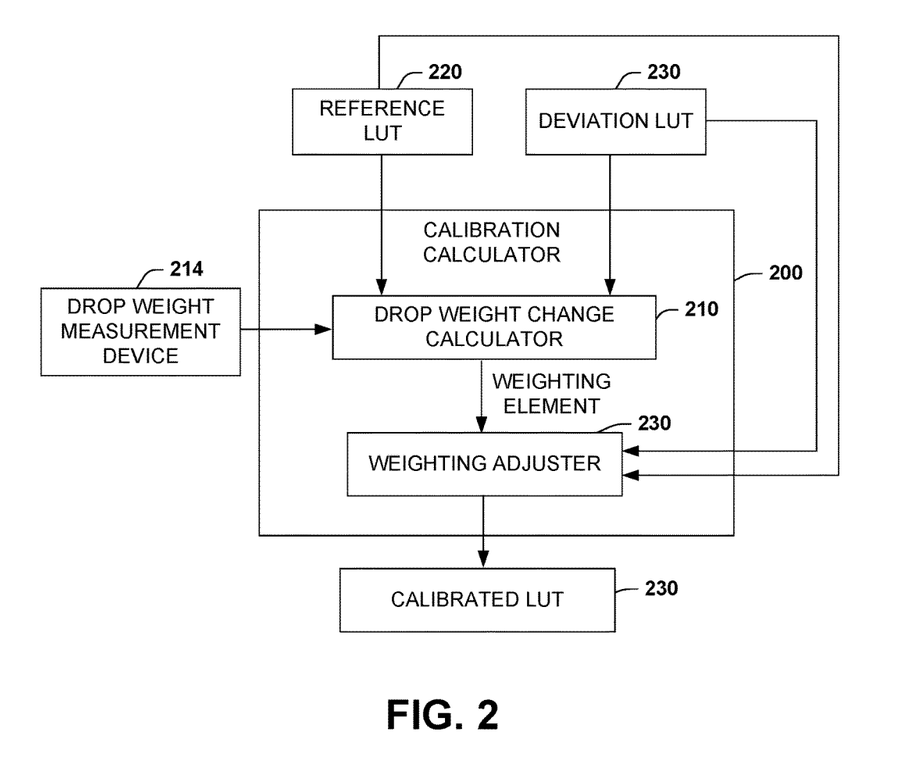
FIG. 2 illustrates an example of a calibration calculator that is employed in a color calibration system to generate a calibrated look-up table.
Figure 3:
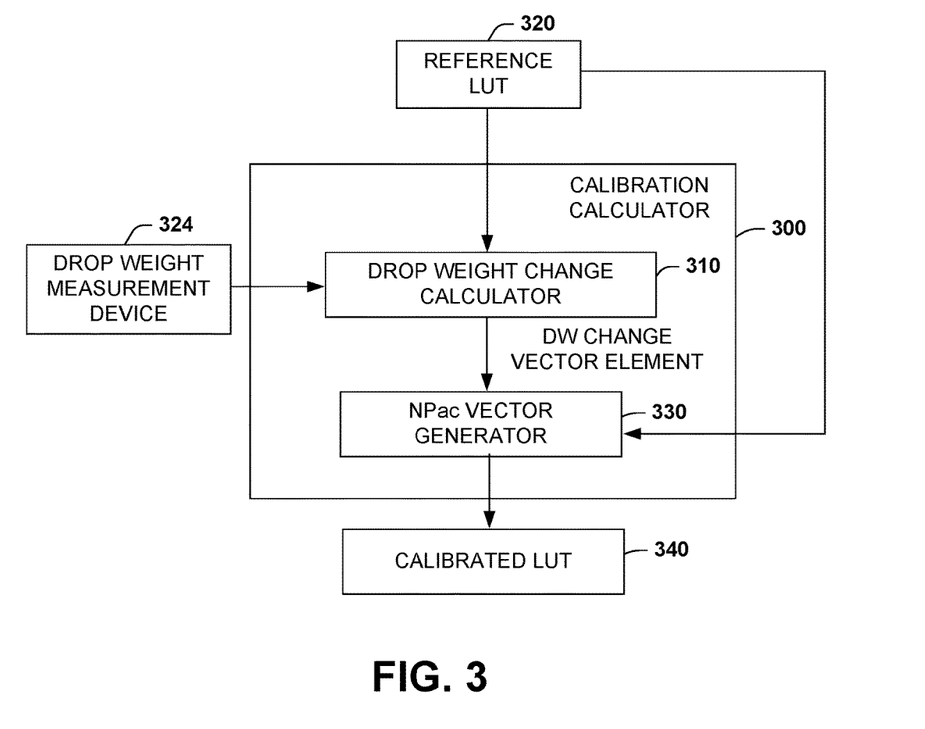
FIG. 3 illustrates an example of an alternative calibration calculator that is employed in a color calibration system to generate a calibrated look-up table.

The instructions include a calibration calculator 150 to compute a calibration element for the HANS LUT that describes a drop-weight deviation with respect to the HANS LUT based on the measured drop weight values. The calibration calculator 150 generates a calibrated LUT 160 to provide calibration for a respective printer based on drop weight measurements from the device 130. The calibration calculator 150 applies the calibration element to at least a portion of the HANS LUT 120 to generate the calibrated LUT 160. The calibrated LUT 160 controls dispensing of colorants from the N colorant channels of the printer by provide an NPac value in response to the device color input value (e.g., an input RGB value). FIGS. 2 and 3 provide different example embodiments of the calibration calculator 150. For example, the calibration calculator 150 generates and processes the calibration element with respect to drop weight change values (e.g., estimated or determined from historical measurements) from the measuring device 130 to generate the calibrated LUT 160, which can be employed by a controller to control colorant dispersal of the printer. In the example of FIG. 2, a scalar weighting element can be generated as the calibration element to calibrate the HANS LUT 120 according to the measured drop weight change values. In the example of FIG. 3, a vector weighting element can be generated as the calibration element to calibrate the HANS LUT 120 according to the measured drop weight change values.

In some examples, the system 100 can be employed to calibrate a HANS pipeline of a printing system. The HANS pipeline may be executed by the processor 140, or in other implementations, by a printer controller of the printing system. In one implementation, the NPacs employed by the HANS pipeline utilize a set of equations referred to as Neugebauer equations. Neugebauer equations are tools for characterizing color printing systems based upon halftoning techniques. The Neugebauer equations, are associated with colors referred to as the Neugebauer Primaries, which in a binary (bi-level) printing device, are the $2^n$ combination of n colorants (e.g., inks) and their overprints, wherein the application of each of the n colorants is at either 0% or 100%. Generally, the number of Neugebauer Primaries (NPs) is $k^n$, where k is the number of levels at which an ink can be used and n is the number of colorants. For example, for a printer utilizing six different inks where 0, 1, or 2 drops of each ink may be specified at each halftone pixel, results in $3^6$ or 729 NPs.

A key challenge in color calibration for conventional systems is the need for a number of measurements that increases with the number of colorants used in a page-wide printing system. The systems and methods described herein provide calibration based on measurements/estimates of only N input quantities—the drop weights of the N colorants (or their relative changes versus the nominal drop weights). This may reduce the number of calibration measurements to be performed via conventional calibration processes in a HANS pipeline. For instance, existing calibration systems either rely on the presence of ink channels to which drop weight changes can be directly applied, or, in the HANS pipeline example, on the measurement of color changes across the device color space (e.g., RGB) involving numerous and costly measurements.

FIG. 2 illustrates an example of a calibration calculator 200 that is employed in a color calibration system to generate a calibrated look-up table to provide efficient color calibration of a printer. The calibration calculator 200 of FIG. 2 can correspond to machine readable instructions stored in non-transitory memory that are executed by a processor such as disclosed herein. The calibration calculator 200 includes a drop weight change calculator 210 that receives drop weight measurements from a measurement device 214 and computes a ratio of drop weight change for N colorant channels of the printer with respect to a predetermined reference of drop weight measurements. Such reference drop weight measurements can be specified in a reference LUT 220 representing reference drop weights for print heads, for example. In some examples, the reference LUT 220 may represent nominal drop weight measurements for new print heads (e.g., maximum drop weight values for new print heads). In other examples, the reference LUT 220 may represent other drop weight values from nominal that are used for comparison in the calibration procedures described herein (e.g., some value in between minimum and maximum drop weight values compared positively or negatively to current measured drop weight values). The drop weight measurement device 214 provides measured drop weight values (e.g., drop weight measurement data) for each the printer's N colorant channels. For example, the drop weight measurement device 214 can employ a closed-loop color measurement process, such as where a color sensor detects reflected energy from primary color tiles that are illuminated with a narrow-band light source. The measurement device 214 can operate in much the same way as a reflection densitometer by measuring light reflected from a substrate printed with each of the N colorants. In some cases, the printer generates a target pattern and a measurement system (e.g., implemented in the printer or an external measurement system) optically scans the pattern to determine the drop weights. This can include utilizing print and measuring ramps of the individual colorants to infer respective drop weight values for each colorant.

The drop weight change calculator 210 analyzes the reference LUT 220 representing the predetermined reference of drop weight measurements with respect to a deviation LUT 230 representing a predetermined amount of deviation (e.g., worst case positive or negative deviation) of the drop weight measurements over time. The drop weight calculator 210 compares the computed ratio of drop weight change for each of the N colorant channels of the printer with respect to the reference LUT 220 and the deviation LUT 230 to determine a drop weight change effect over the N colorant channels. The drop weight calculator 210 determines the drop weight change effect for each of the N colorant channels by calculating a weighting element based on historical data of drop-weight change as a function of printer usage. The weighting element maps N-drop-weight change ratios to a scalar value that is proportional to a distance of drop weight difference between nodes of the reference LUT 220 to respective nodes deviation LUT 230, where distance refers to the amount of drop change that has occurred between the respective LUTs.

The weighting element can be based on previously analyzed historical data of drop-weight change as a function of printer colorant dispenser usage (e.g., print head, nozzle, pen, and so forth), for example. It is reasonable to assume that each of the printer colorant dispensers may be used similarly, and thus will degrade similarly. Hence the drop-weight changes for each of the N colorants can be assumed to be correlated (although they need not be the same).

The calibration calculator 200 also includes a weighting adjuster 250 to apply the weighting element to the reference LUT 220 and the deviation LUT 230 to determine the calibrated LUT 240 representing an adjustment to the HANS LUT described previously. For example, the weighting adjuster 250 computes the calibrated LUT 240 as follows:

$$LUTR*WE+(1-WE)*LUTD,$$

where LUTR is each node of the reference LUT 220, LUTD is each node of the deviation LUT 230, and WE is the weighting element.

This weighting adjustment can be performed in the context of a HANS pipeline since each node of a LUT represents an NPac, and NPacs can be convexly combined to form new calibrated NPacs. In a convex geometry, a convex combination (e.g., performed by adjuster 250) is a linear combination of points (which can be vectors, scalars, or more generally points in an affine space) where all coefficients are non-negative and sum to 1.

FIG. 3 illustrates an example of an alternative calibration calculator 300 that is employed in a color calibration system (e.g., system 100) to generate a calibrated look-up table. In this example, rather than computing a scalar weighting element such as described above with respect to FIG. 2, a change vector element is generated by the calibration calculator 300. The change vector element described herein can represent change behavior for all inks by comparing the results of taking measurements (e.g., printing ink-ramps) with respect to a reference or nominal measurement. For example, at continuous tone (e.g., contone) level 128, a nominal density of 50 as a reference (e.g., on a [0 100] scale) may be compared to a printed calibration pattern having a measured density of 40, for example. Thus, in this example, a [−10] difference for this ink is determined where the scale is 10 having a reduction from the nominal. This type of analysis can be performed for all inks. From these deviations or differences from nominal, a change vector element is generated that can be denoted as $\Delta$ that =[$\Delta C$, $\Delta M$, $\Delta Y$, $\Delta K$, . . . ], where C, M, Y, K represent different colorants in a CYMK color model. The result of this analysis is an N-vector (for N inks) which has magnitude (e.g., 10 in this example) and direction (e.g., negative in this example).

The calibration calculator 300 can be implemented as instructions stored in a non-transitory media and executed by a processor. In the example of FIG. 3, the calibration calculator 300 includes a drop weight change calculator 310 that determines a drop weight change vector element with respect to a reference LUT 320 based on drop weight measurements. A measurement device 324 provides measured drop weight values to the drop weight change calculator 310 as previously described. The drop weight change vector element represents a direction and magnitude for colorant dispersal in colorant space. The calibration calculator 300 includes an NPac vector generator 330 to generate a calibrated LUT 340 that includes a calibrated NPac vector for each NPac in the reference LUT. The calibrated NPac vector for each NPac in the reference LUT represents drop weight change ratios expressed by the drop weight change vector element as applied to each NPac of the reference LUT 320.

In one example, the vector generator 330 utilizes tessellation processing in colorant space and interpolates from the drop weight change vector element to each NPac in the reference LUT 320 to generate the calibrated NPac vector for each NPac in the reference LUT 320. As used herein, tessellation refers to processing a collection of polytopes (e.g., polygons in two dimensions, polyhedra in three dimensions) that fill the convex hull of the color gamut for the range of colorants with no overlaps or gaps. In one example, tesselation can be performed using the Delaunay tessellation technique. In other implementations, other tessellation techniques may be used. Since the NPs can be combined convexly and relate to colorimetry in a linear color space, the tessellation technique may be any geometric tessellation technique.

For instance, the LUTs described herein can be defined in terms of NPacs, which can be expressed in terms of colorant-vectors (e.g., an NPac of [50% Blank, 25% C1, 20% M1, 5% C1M1] would be an colorant-vector of [30% Cyan, 25% Magenta]. Note that C1, M1, C1M1 being NPs, while Cyan/Magenta are colorants. Thus, a LUT is provided that has a colorant-vector at every node and this is in ND (N=number of inks) instead of MD (M=number of NPs) whereby M»N. The vector generator 330 can tessellate this space (e.g., partition it) in ND and then look for the partition which contains the newly formed colorant-vector (after having applied the change factor from $\Delta$). Interpolation can then be performed (e.g., computing barycentric weights of the calibrated colorant-vector within the partition and applying these to the vertices of the partition) to generate a new calibrated NPac.

In another example, the vector generator 330 utilizes an iterative search routine such as a gradient descent, for example, to modify each NPac in the reference LUT 320 in the direction specified by the drop weight change vector element to generate the calibrated NPac vector for each NPac in the reference LUT. For example, if too much error occurs with tesselation and interpolation (e.g., in cases where the sought colorant-vector is not contained in any of the partitions of the reference LUT), gradient descent can be employed to find a suitable NPac, minimizing the error (e.g., since there is no choice otherwise without error). In one example, gradient descent is a first-order optimization technique to find a local minimum of a function by executing processing steps proportional to the negative of the gradient (or of the approximate gradient) of the function at the current point. Gradient descent operates to directly modify NPacs according to $\Delta$ (defined in a different space) and does not rely on the fact that the target colorant-vector (applying the $\Delta$ vector to the source colorant-vector which is re-expressed from the source NPac) is contained in a partition. In other words, in one example gradient descent need not involve the 'calibrated' NPac space being strictly contained in the un-calibrated space. In one example, this is an iterative approach that attempts to minimize a metric following the direction of a gradient. The gradient here is that of the distance of the colorant-vectors (original and ideal) and the process would gradually construct new NPacs as linear (convex) combinations of the LUT NPacs and check the distance metric, trying to minimize it with each step. A cut-off can be defined after which the distance is sufficiently small (e.g., the steps of each iteration are insignificant—this is standard practice in gradient descent techniques) for the new NPac to be acceptable.

The above described examples with respect to FIGS. 2 and 3 can assume that the drop-weight ratios obtained from measurements are such that they fall in the domain of the pre-computed reference LUT and/or deviation LUT in the case of FIG. 2. For instance, (for FIG. 2) the weighting element can be computed and that applying it as a weight to the extreme LUTs (reference and deviation) results in new calibrated LUT that represents the NPacs for each device color input according to the current state of drop-weights. With respect to FIG. 3, color-channel shifts can be determined by the change vector element such that NPacs exist for each LUT node in the color-channel tessellated domain that reflect the shift. These assumptions imply printer dispensers degrading similarly between different colorants which is a reasonable assumption for general purpose printing conditions.

One example approach to process special cases includes characterizing the degradation off-line to generate the reference LUT. For example, a blue-print set-up may need to calibrate principally changes to the print dispensers that are used for printing blue (e.g. Cyan and Magenta or a Blue ink if present) and from historical data correlated proportions of degradation can be obtained.

Figure 4:
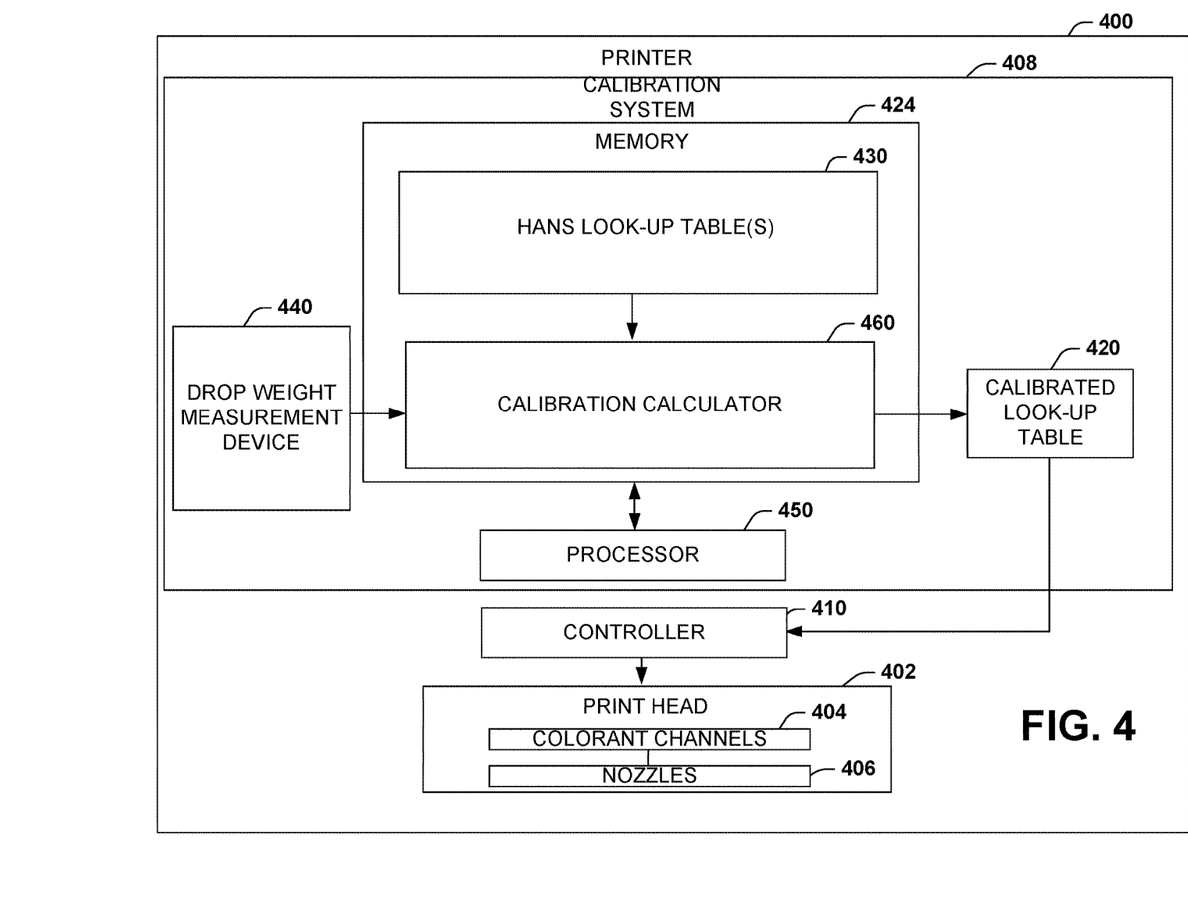
FIG. 4 illustrates an example of a printer that employs a calibrated look-up table.

FIG. 4 illustrates an example of a printer 400 that employs a calibrated look-up table to provide efficient color calibration of the printer. The printer 400 includes a print head 402 having a plurality of channels 404 (e.g., ink wells or channels) to disperse colorants on a substrate (e.g., paper, plastic, and so forth) via a plurality of nozzles 406. The printer 400 includes a controller 410 to issue drop weight commands to the print head 402 to control the amount and pattern of colorant dispersed on the substrate. A calibration system 418 provides a calibrated LUT 420 to the controller 410 to adjust the amount of colorant dispersed on the substrate.

The calibration system 418 a memory 424 to store at least one HANS LUT 430 that represents a predetermined drop weight for N colorant channels of a printer. The HANS LUT 430 provides a given NPac in response to a device color input value. A measuring device 440 measures drop weight values for the plurality of different colorants of the printer 400. While the measuring device 440 is demonstrated as internal to the printer in the example of FIG. 4, in other examples, it could be external to the printer and provide drop weight measurements to the printer, such as via a corresponding interface (not shown). A processor 450 executes instructions from the memory 424. The instructions (or hardware logic as previously described) include a calibration calculator 460 to compute a calibration element for the HANS LUT 430 that describes a drop-weight deviation with respect to the HANS LUT based on the measured drop weight values. The calibration calculator 460 applies the calibration element to at least a portion of the HANS LUT 430 to generate the calibrated LUT 420 to control dispensing of colorants from the N colorant channels of the printer.

Figure 5:
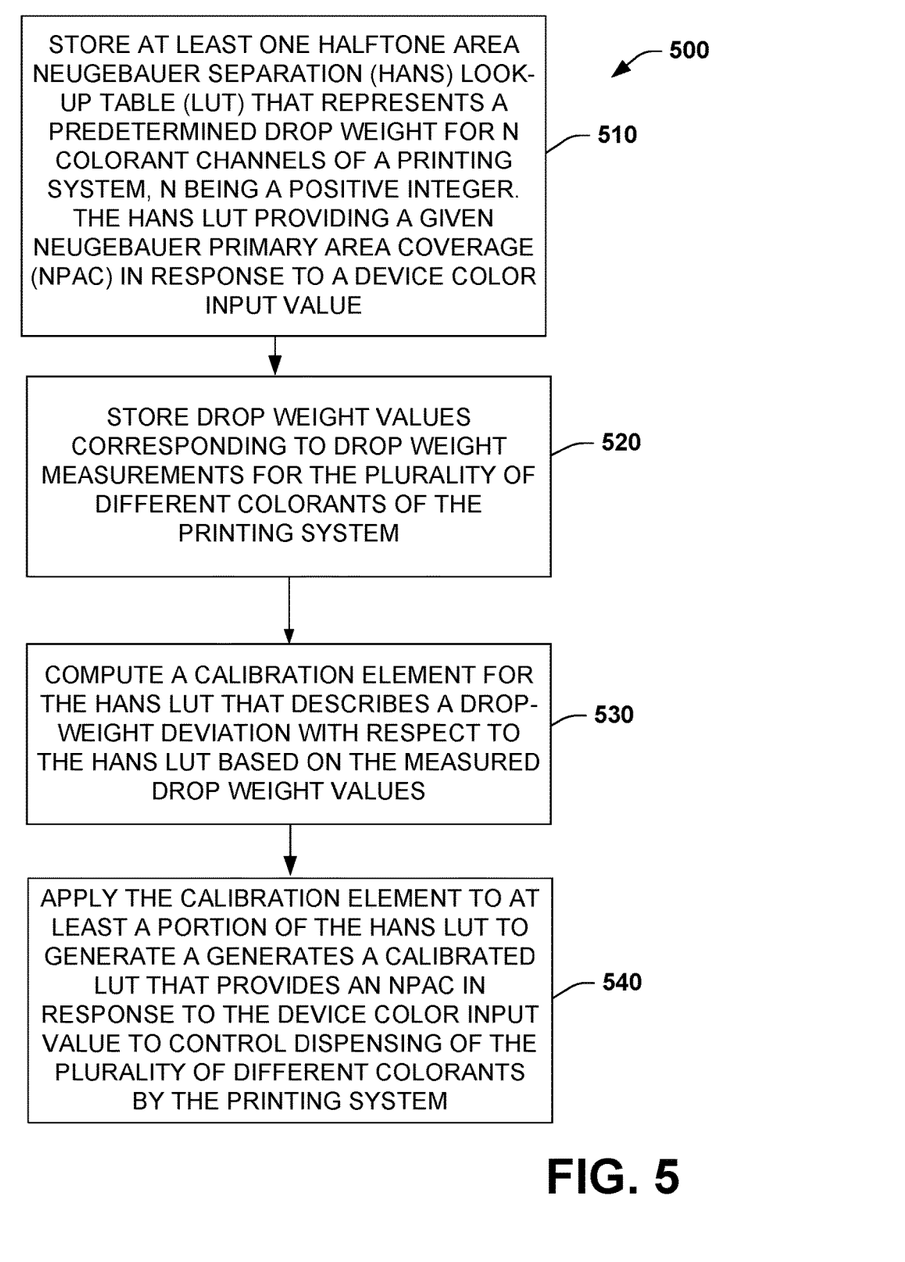
FIG. 5 illustrates an example of a method to generate a calibrated look-up table.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be implemented by instructions executed by various components such as by one or more processors, an integrated circuit, computer, and/or a controller, for example.

FIG. 5 illustrates an example of a method 500 that generates a calibrated look-up table to provide efficient color calibration of a printer. At 510, the method 500 includes storing at least one HANS LUT that represents a predetermined drop weight for N colorant channels of a printing system, N being a positive integer (e.g., via processor 140, 450). The HANS LUT provides a given NPac in response to a device color input value. At 520, the method 500 includes storing drop weight values corresponding to drop weight measurements (e.g., via measurement device 130, 214, 324, 440) for the plurality of different colorants of the printing system. At 530, the method 500 includes computing a calibration element for the HANS LUT that describes a drop-weight deviation with respect to the HANS LUT based on the measured drop weight values (e.g., via calibration calculator 150, 200, 300, 460). At 540, the method 500 includes applying the calibration element to at least a portion of the HANS LUT to generate a calibrated LUT to provide an NPac in response to the device color input value to control dispensing of the plurality of different colorants by the printing system (e.g., weighting adjuster 250 or vector generator 330). Although not shown, the method 500 can include computing a ratio of drop weight change for N colorants of the printing system with respect to a predetermined reference of drop weight measurements to generate a calibrated LUT for the HANS LUT to control dispensing of the plurality of different colorants (e.g., CMYK colorants) by the printing system.

What have been described above are examples. One of ordinary skill in the art will recognize that many further combinations and permutations are possible. Accordingly, this disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system, comprising:
a memory to store at least one Halftone Area Neugebauer Separation (HANS) look-up table (LUT) that represents a predetermined drop weight for N colorant channels of a printer, N being a positive integer, the HANS LUT providing a given Neugebauer Primary area coverage (NPac) in response to a device color input value;
measurement data stored in the memory to represent measured drop weight values for the N colorant channels of the printer; and
a processor to execute instructions stored in the memory, the instructions to:
compute a calibration element for the HANS LUT that describes a drop-weight deviation with respect to the HANS LUT based on the measured drop weight values,
apply the calibration element to at least a portion of the HANS LUT; and
generate a calibrated LUT that provides an NPac in response to the device color input value to control dispensing of respective colorants from the N colorant channels of the printer.

2. The system of claim 1, the instructions further to receive the measured drop weight values from a measurement device and compute a ratio of drop weight change for the N colorant channels of the printer with respect to a predetermined reference of drop weight measurements.

3. The system of claim 2, wherein the at least one HANS LUT further comprises a reference LUT representing the predetermined reference of drop weight measurements and a deviation LUT representing a predetermined amount of deviation of the drop weight measurements, the instructions further to:
analyze the reference LUT with respect to the deviation LUT;
compare the computed ratio of drop weight change for the N colorant channels of the printer to the reference LUT; and
determine a drop weight change effect over each of the N colorant channels.

4. The system of claim 3, the instructions further to determine the compound drop weight change effect over each of the N colorant channels by calculating a weighting element based on historical data of drop-weight change as a function of measured printer usage, the weighting element maps N-drop-weight change ratios to a scalar value that is proportional to a distance of drop weight differences between nodes of the reference LUT to nodes of the deviation LUT.

5. The system of claim 4, the instructions further to:
apply the weighting element to the reference LUT and the deviation LUT to determine the calibrated LUT representing a calibration adjustment to the HANS LUT; and
compute the calibrated LUT as LUTR*WE+ (1−WE)*LUTD,
where LUTR is each node of the reference LUT, LUTD is each node of the deviation LUT, and WE is the weighting element.

6. The system of claim 2, wherein the at least one HANS LUT further comprises a reference LUT representing the predetermined reference of drop weight measurements, and the instructions further to determine a drop weight change vector element with respect to the reference LUT.

7. The system of claim 6, the instructions further to generate a calibrated NPac vector for each NPac in the reference LUT, the calibrated NPac vector for each NPac in the reference LUT represents drop weight change ratios expressed by the drop weight change vector element that is applied to each NPac of the reference LUT.

8. The system of claim 7, the instructions further to utilize a tessellation in colorant space to interpolate from the drop weight change vector element to each NPac in the reference LUT and to generate the calibrated NPac vector for each NPac in the reference LUT.

9. The system of claim 7, the instructions further to utilize an iterative search routine to modify each NPac in the reference LUT in a direction specified by the drop weight change vector element to generate the calibrated NPac vector for each NPac in the reference LUT.

10. A printer, comprising:
a print head including N colorant channels to disperse N different colorants on a substrate, N being a positive integer;
a controller to issue drop weight commands to the print head to control an amount of each colorant from the N colorant channels dispersed on the substrate; and
a calibration system to provide a calibrated look-up table (LUT) to the controller to specify the amount of each colorant from the N colorant channels dispersed on the substrate, the calibration system comprising:
a memory to store at least one Halftone Area Neugebauer Separation (HANS) look-up table (LUT) that represents a predetermined drop weight for the N colorant channels of the printer, the HANS LUT providing a given Neugebauer Primary area coverage (NPac) in response to a device color input value;
measurement data stored in the memory to represent measured drop weight values for the N colorant channels of the printer; and
a processor to execute instructions stored in the memory, the instructions to:
compute a calibration element for the HANS LUT that describes a drop-weight deviation with respect to the HANS LUT based on the measured drop weight values,
apply the calibration element to at least a portion of the HANS LUT; and
generate a calibrated LUT to control dispensing of colorants from the N colorant channels of the printer.

11. The printer of claim 10, the instructions further to receive drop weight measurements from a measurement device and to compute a ratio of drop weight change for the N colorant channels of the printer with respect to a predetermined reference of drop weight measurements.

12. The printer of claim 11, wherein the at least one HANS LUT further comprises a reference LUT representing the predetermined reference of drop weight measurements and a deviation LUT representing a predetermined amount of deviation of the drop weight measurements; and the instructions further to:
determine the compound drop weight change effect over the N colorant channels by calculating a weighting element based on historical data of drop-weight change as a function of printer usage, the weighting element maps N-drop-weight change ratios to a scalar value that is proportional to the distance of drop weight difference between the reference LUT to the deviation LUT.

13. The printer of claim 11, wherein the at least one HANS LUT further comprises a reference LUT representing the predetermined reference of drop weight measurements, the instructions further to generate a calibrated NPac vector for each NPac in the reference LUT, the calibrated NPac vector for each NPac in the reference LUT represents drop weight change ratios expressed by the drop weight change vector element as applied to each NPac of the reference LUT.

14. A method, comprising
storing at least one Halftone Area Neugebauer Separation (HANS) look-up table (LUT), in a memory, that represents a predetermined drop weight for N colorant channels of a printing system, N being a positive integer, the HANS LUT providing a given Neugebauer Primary area coverage (NPac) in response to a device color input value;
storing drop weight values, in the memory, corresponding to drop weight measurements for the N colorant channels of the printing system;
computing a calibration element for the HANS LUT, via a processor, that describes a drop-weight deviation with respect to the HANS LUT based on the measured drop weight values; and
applying the calibration element to at least a portion of the HANS LUT, via the processor, to generate a calibrated LUT that provides an NPac in response to the device color input value to control dispensing of the N colorant channels by the printing system.

15. The method of claim 14, further comprising computing a ratio of drop weight change for N colorant channels of the printing system, via the processor, with respect to a predetermined reference of drop weight measurements to generate a calibrated LUT for the HANS LUT to control dispensing of the plurality of different colorants by the printing system.

* * * * *

UNITED STATES PATENT AND TRADEMARK OFFICE
CERTIFICATE OF CORRECTION

| | |
|---|---|
| PATENT NO. | : 10,440,231 B2 |
| APPLICATION NO. | : 16/073393 |
| DATED | : October 8, 2019 |
| INVENTOR(S) | : Peter Morovic et al. |

Page 1 of 1

It is certified that error appears in the above-identified patent and that said Letters Patent is hereby corrected as shown below:

On the Title Page

In Column 2, item (56), Foreign Patent Documents, Line 1, delete "16444383" and insert -- 1644383 --, therefor.

In the Drawings

In sheet 5 of 5, FIG. 5, reference numeral 540, Line 3, after "A" delete "GENERATES A".

Signed and Sealed this
Third Day of March, 2020

Andrei Iancu
*Director of the United States Patent and Trademark Office*